Sept. 17, 1957            A. J. HUCK            2,806,421
TOASTER CONTROL USING A NEGATIVE TEMPERATURE
COEFFICIENT RESISTOR
Filed May 27, 1950            2 Sheets-Sheet 1
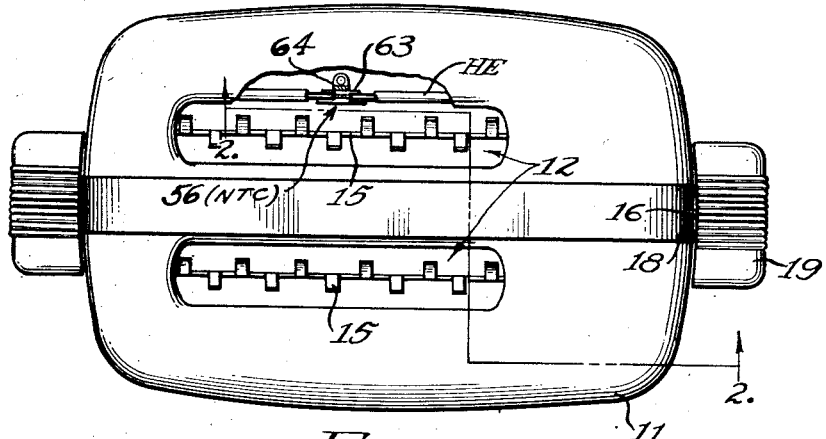
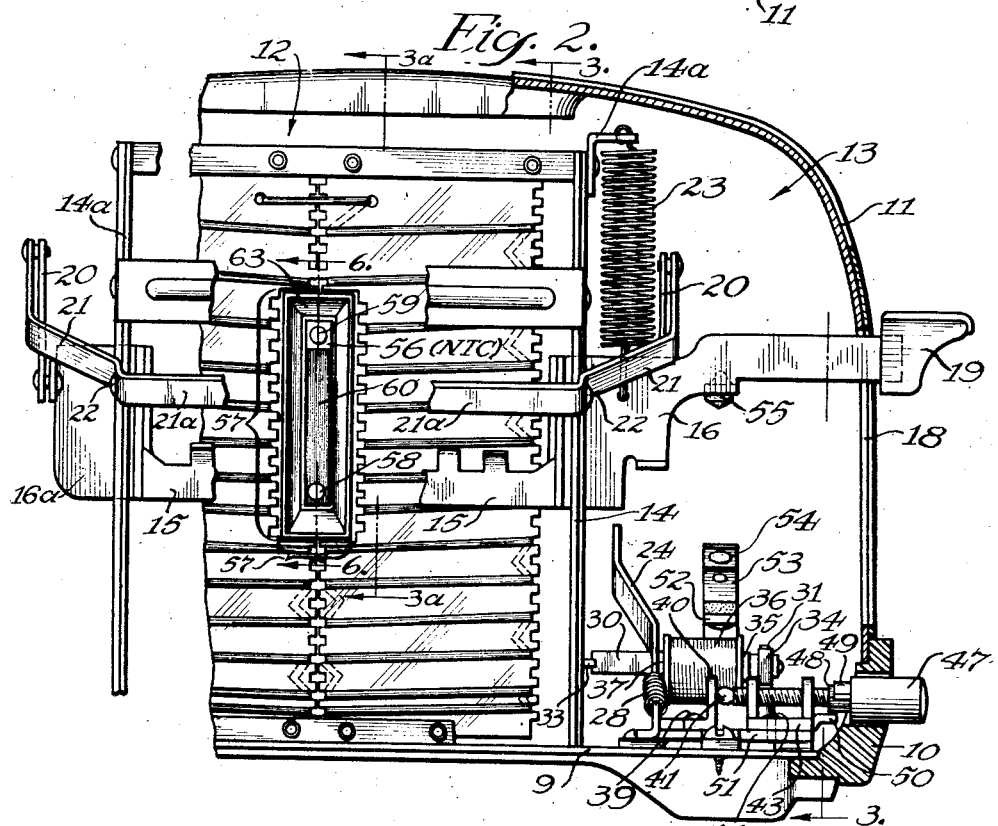
Inventor
Alfred J. Huck
By Bair, Freeman
& Molinare Attorneys

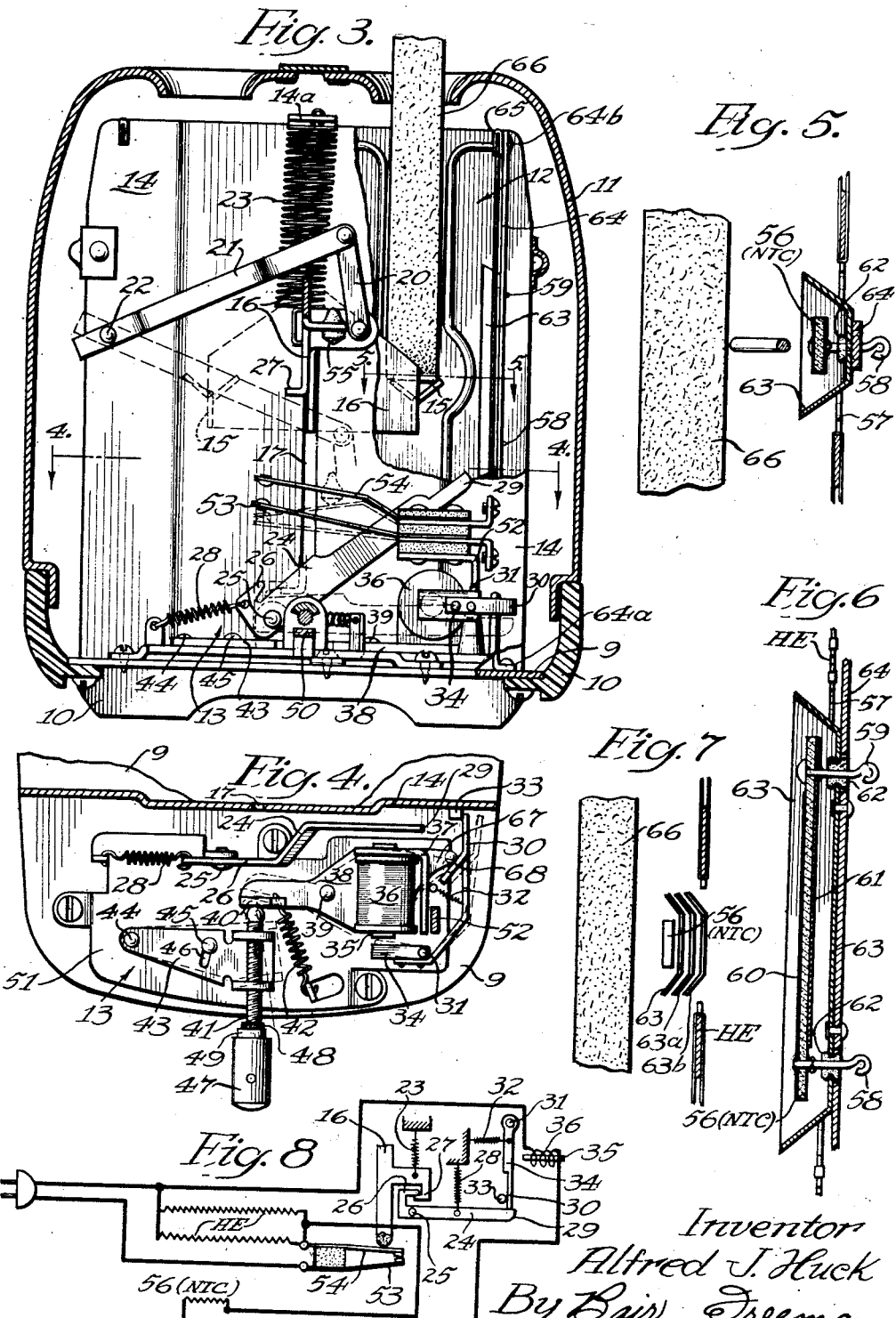

United States Patent Office 2,806,421
Patented Sept. 17, 1957

2,806,421

TOASTER CONTROL USING A NEGATIVE TEMPERATURE COEFFICIENT RESISTOR

Alfred J. Huck, St. Louis, Mo., assignor to Knapp-Monarch Company, St. Louis, Mo., a corporation of Delaware Application May 27, 1950, Serial No. 164,677

1 Claim. (Cl. 99—329)

This invention relates to an automatic control for toasters and the like wherein a temperature sensitive element responds to the surface temperature of the toast for terminating a toasting operation.

One object of the invention is to provide a toaster control of this general character in which the temperature responsive element comprises a negative temperature coefficient resistor so located with respect to heating elements of the toaster and the slice of bread being toasted that it responds to the temperature of a substantial portion of the surface of the toast and is so shielded from radiant heat from the toaster heating elements as to make the response primarily to the surface temperature of the toast to the substantial exclusion of the temperature effect of the heating elements.

Another object is to provide a temperature responsive element responding to the surface temperature of the toast which element involves an operating principle having inherently large safety factors which insure against erratic operation because of a combination of two radical charactersitcs, (1) the radical rate of change of resistance in a negative temperature coefficient resistor with temperature change, and (2) the radical rate of change of heat radiated from the toast as it attains medium toast color.

A further object is to provide a simple arrangement for accurately controlling the termination of the toasting cycle regardless of the moisture content of the bread, the variation in intervals between toasting cycles, variations of toaster compartment temperatures which become higher the longer the toaster is operated, and other factors.

Still a further object is to provide an automatic control for a toaster in which means is responsible to radiant heat from the toast to effect a control function.

With these and other objects in view, my invention consists in the construction, arrangement and combination of the various parts of my toaster control using a negative temperature coefficient resistor, whereby the objects contemplated are attained, as hereinafter more fully set forth, pointed out in my claim and illustrated in the accompanying drawings, wherein:

Figure 1 is a plan view of a toaster to which my automatic control has been applied, a portion being broken away to show the temperature responsive element.

Figure 2 is an enlarged vertical sectional view on the line 2—2 of Figure 1.

Figure 3 is a sectional vertical view on the line 3—3 of Figure 2, this section being in the control compartment and a portion being broken out and a section through the toasting compartment shown on the line 3a—3a of Figure 2.

Figure 4 is a sectional view on the line 4—4 of Figure 3 showing a plan view of the mechanism in the control compartment.

Figure 5 is an enlarged horizontal sectional view on the line 5—5 of Figure 3.

Figure 6 is an enlarged vertical sectional view on the line 6—6 of Figure 2.

Figure 7 is a diagrammatic view similar to Figure 5 showing a modified construction; and Figure 8 is an electrodiagrammatic view of my toaster control.

On the accompanying drawings I have used the reference numeral 10 to indicate a base preferably formed of insulating material. A casing 11 of sheet metal is mounted thereon for enclosing the toaster mechanism and the control mechanism therefor. The space within the housing 10 is divided into a toasting compartment 12 and a control compartment 13 by a wall 14.

Bread carriers 15 are mounted for vertical movement, being carried at the front end by a bracket 16 and a similar bracket at the rear (not shown), the bracket 16 extending through a slot 17 in the wall 14 and on through a slot 18 in the casing 11 to a bread carrier depressing knob 19 on the outside of the casing.

To maintain the ends of the bread carriers 15 at the same level, they are connected by a pair of links 20 with a pair of arms 21 which are pivoted at 22 to the wall 14 and a similar wall 14a at the opposite end of the toaster. The element 21a is a rigid connector between the arms 21.

To normally keep the bread carriers 15 in a raised position, a spring 23 is provided connected with the bracket 16 and with a bracket 14a at the upper end of the wall 14. Obviously when the knob 19 is depressed the spring 23 will be stretched and when the knob is released the spring will return the bread carriers to elevated position except for a latch of my control structure which will be described later.

The latching arrangement just referred to comprises a latch lever 24 pivoted at 25 and having a hook 26 to engage a flange 27 of the bracket 16 when it is depressed. The flange first engages the top of the lever 24 to the right of the pivot in Figure 3 to swing the lever from the elevated position it normally assumes due to the action of a spring 28 whereupon the hook 26 assumes a position overhanging the flange 27 as shown by dotted lines in Figure 3.

During the depressing action, the outer end 29 of the lever 24 engages a latch 30 pivoted at 31 and swings it nearly to the dotted position of Figure 4 to permit the end 29 to pass under the latch 30 after which the latch is returned by a spring 32 against a stop 33 for holding the lever 24 in the lowered position and likewise the bread carriers 15 in the toasting position.

The latch 30 is connected with an armature 34 adapted to be attracted by a core 35 of the an electromagnet 36. The magnet is connected with a magnetic bracket 37, the magnet and the bracket being supported by a plate 38 pivoted at 39. The plate has a flange 40 engaged against an adjusting screw 41 by a spring 42. The adjusting screw is carried by a bracket 43 pivoted at 44 and limited in its motion by a rivet 45 and a slot 46.

An adjusting knob 47 is frictionally engaged on a fluted portion 48 of the adjusting screw 41 so that it can be removed and adjusted relative thereto. The knob is limited to approximately a half revolution of adjustment by a hub 49 extending part way therearound and a lug 50 from the bracket 43.

The control device described in the foregoing specification is mounted on a base plate 51 which in turn is mounted on a bottom plate 9. The plate 9 is mounted in the base 10. Extending upwardly from the base plate 51 is a main switch bracket 52. Switch arms 53 and 54 are mounted on the bracket 52 and suitably insulated therefrom. The bracket 16 of the bread carrier 15 is provided with an insulating button 55 to engage the switch arm 54 whose contact is normally out of engagement with the contact of the arm 53. When the button 55 engages the arm 54 contacts are closed prior to the bread carrier being fully depressed to latched position.

For controlling the action of the electromagnet 36 I provide a temperature responsive element in the form of a bar 56 of resistance material having a negative temperature coefficient (designated "NTC" on the drawings). Resistors of this character change radically in resistance in response to temperature changes with a decrease in resistance as the temperature rises.

I have made many tests to determine the surface temperature of bread which is being toasted. I have found that as it reaches the medium shade of toast color very uniform temperature readings resulted each time regardless of whether the toaster was hot from previous toasting or whether the bread was relatively moist or dry. I therefore provide a negative temperature coefficient resistor responsive to the toast surface temperature such as the element 56 which is preferably elongated as illustrated in Figure 2 and located in a cut-out area 57 of of the heating elements HE as illustrated. The heating elements therefore radiate heat to all but the central portion of the slice of toast and radiate enough heat to that portion to make it almost the same color as the rest of the slice or at least not objectionably lighter. The negative temperature coefficient resistor 56 is preferably located at the center of the slice so as to obtain maximum response to average or overall temperature of the surface of the toast.

The negative temperature coefficient resistor 56 may be mounted in various ways, one form of mounting being shown in Figures 5 and 6 comprising terminal rods or wires 58 and 59 soldered to fired silver paint coatings 60 and 61 of the negative temperature coefficient resistor. The terminals 58 and 59 extend through insulating bushings 62 supported by a shield 63. The shield in turn is supported by a bar 64 connected at its lower end at 64a to the base plate 9 and at its upper end by a rivet 64b to a cross bar 65 as shown in Figure 3.

The shield 63 is so shaped that it shields the negative tempearture coefficient resistor 56 from direct radiant heat from the heating elements HE and tends to gather and concentrate heat from the surface of the slice of toast indicated at 66 on the resistor for maximum response thereof to a relatively larger area of the toast than the area of the resistor itself. The negative temperature coefficient resistor is blackened on the bread side for maximum heat absorption from the bread surface and bright on the back side for maximum reflection of heat from the heating element back to the toaster shell so that the main response of the resistor is actually to the toast surface temperature.

The negative temperature coefficient resistor 56 is provided in a control circuit as shown in Figure 8 including the electromagnet 36 in series with it across the heating elements HE. The heating elements are in series with the switch blades 53 and 54 to be controlled by them. The blades when open also cut off the current supply to the negative temperature coefficient resistor 56 and the electromagnet 36.

*Practical operation*

The control knob 47 may be set at the desired position for the color of toast desired such as "light," "medium" or "dark." The slices of bread are placed on the carriers 15 and the knob 19 is depressed which causes the insulating button 55 to engage the switch blade 54 and close its contact against the contact of the switch blade 53. The flange 27 of the bracket 61 depresses the latch lever 24 from the solid line position of Figure 3 to the dotted line position where it is latched under the latch 30.

Closure of the contacts of the main switch (blades 53 and 54) energizes the heating elements HE as evident in Figure 8 and also establishes a circuit through the negative temperature coefficient resistor 56 and the electromagnet 36. Since the toaster is cool the resistance of the resistor 56 is relatively high and thus insufficient current flows through the coil 36 to produce enough magnetism in the core 35 and the core bracket 37 to attract the armature 34.

As the bread is toasted, its temperature rises increasing to about the same temperature for all slices of bread when they attain about the same color regardless of the moisture content. The surface temperature is radiated to the negative temperature coefficient resistor, the shield 63 aiding in the collection of the radiant heat rays emitted and the concentration thereof on the resistor.

At the desired color setting of the knob 47, current through the resistor has increased to a point where it magnetizes the elements 35 and 37 of the electromagnet sufficiently for attaching the armature 34 against the bias of the spring 32, thus moving the armature to the dotted position of Figure 4 which releases the latch arm 24 so that the flange 27 can be slipped from under the hook by the action of the spring 23 thus raising the bracket 16 and the bread carriers 15 to open the circuit at the main switch 53—54 and to raise the toast to an elevated position. The toasting operation is thereby terminated since the heating elements are cut off at this time by the main switch.

By shielding the negative temperature coefficient resistor 56 from heat radiated from the heating elements and concentrating heat radiated from the surface of the toast by means of the shield 63, the resistance of the resistor decreases sufficiently for operating the electromagnetically controlled latch 30 and the toasting interval can be lengthened by the adjusting knob 47 moving the core 35 and the core bracket 37 away from the armature 34 or can be decreased by moving them toward the armature.

The use of a negative temperature coefficient resistor causes a radical control characteristic and thus provides a positive means of terminating the cycle when the resistor attains a certain temperature due to heat absorption from the bread. The electromagnet 36 attains sufficient magnetization to attract the armature 34 and trip the latch 30 by virtue of the fact that the current in the coil of the electromagnet builds up to a certain trip value as the temperature of the resistor increases and its resistance therefore decreases. Since the coil is in series with the resistor, this trip value of current is dictated almost entirely by the exact value of the resistance of the resistor. When the resistance of the resistor decreases to less than the resistance or impedance of the coil 36, the coil effects tripping of the latch.

A negative temperature coefficient resistor suitable for our purpose is one which starts at about 1000 ohms resistance at room temperature and decreases to about 600 ohms at 125 degrees, 400 ohms at 165 degrees, 200 ohms at 275 degrees, 100 ohms at 340 degrees, and 50 ohms at 400 degrees. Comparing the ohmage values and the temperatures just enumerated, it will be realized that after about 300 degrees, the resistance value drops off at a very rapid rate so that the coil 36 can be matched with the negative temperature coefficient resistor used to secure trip-out of the coil within very close temperature limits.

If it is desired to terminate the toasting operation manually before it is automatically terminated, this can be accomplished by pushing in on the knob 47 which swings the bracket 38 about the pivot 39 to cause a pin 67 of the bracket to engage a finger 68 on the latch 30 and move the latch to the dotted position of Figure 4, all three parts 43, 38 and 30 being shown dotted in this figure to illustrate the manual release.

Referring to Figure 6, if the heating elements HE affect the negative temperature coefficient resistor 56 more than desired, secondary and tertiary shields 63a and 63b may be provided spaced from the shield 63 as shown diagrammatically. This provides air spaces between the shields and these spaces would be ventilated to some extent by the natural draft in the toaster. Thus it is possible to get any degree of predominance of response of the resistor to the toast surface temperature and minimize response to heating element temperature so as to secure most accurate results.

From the foregoing specification, it will be obvious that I have provided a toaster cycle controller in which the heat radiated from the toast is used to perform the control function. As the bread darkens during the last stages of the toasting interval, the resistance of the resistor 56 decreases radically to supply the necessary current for terminating the toaster operation at the desired toast color regardless of voltage variation, freshness of bread, waiting time between toasting cycles, and similar variables which adversely affect the usual control switches and timers used in connection with toasters.

The operating principle disclosed has an inherently large safety factor against erratic operation because of the combination of two radical characteristics, the radical rate of change of the negative temperature coefficient resistance relative to temperature change, and the radical rate of change of heat radiated from the toast as it attains the desired color. Thus the control device disclosed is not particularly critical and can be nicely adjusted for the desired color of toast in the range between the usual designation of "light" toast and "dark" toast.

A relatively small resistor can be used for sensing the toast surface temperature so that a minimum cut-out of the center of the heating element as indicated at 57 is necessary, thus minimizing the slightly lighter spot at the center of the slice of toast. Also by elongating the resistor as disclosed and arranging it parallel with the long center of the slice the size of such light spot is minimized, particularly because it is relatively narrow. It seems necessary, however, to slightly space the edge of the shield 63 from the opening 57 in the heating elements, and double and triple shield arrangements are somewhat superior to the single shield arrangement.

Some changes may be made in the construction and arrangement of the parts of my toaster control using a negative temperature coefficient resistor without departing from the real spirit and purpose of my invention, and it is my intention to cover by my claim any modified forms of structure or use of mechanical equivalents which may be reasonably included within their scope.

I claim as my invention:

A bread toaster comprising a pair of electrically energizable heating elements, bread slice holding means including a latch means for energizing said heating elements and for holding a bread slice in a toasting position between said heating elements and for maintaining said heating elements energized when said bread slice is in said toasting position, a toasting interval control means including an electric control circuit that is energized when said heating elements are energized and is adapted for effecting release of said latch means, said control circuit having therein a negative temperature coefficient resistor that is mounted adjacent one of said pair of heating elements and is positioned to intercept radiant energy emitted by the heated surface area of the bread slice and being responsive to predetermined radiant energy emission from said heated surface to the said negative temperature coefficient resistor for terminating a bread toasting interval, a shielding structure between said resistor and said adjacent heating element for limiting the response of said negative temperature coefficient resistor to that effect by said radiant energy emitted by said bread and to the exclusion of radiant energy emitted from said heating elements, said electrically energized control circuit being responsive to a predetermined increase in current flow therethrough, which current is under control of said resistor as it responds to intercepted radiant energy emitted from the bread slice, for effecting release of said latch means and for thereby terminating a bread toasting interval, and said shielding structure including a plurality of spaced shield elements which define air passageways between pairs of adjacent shield elements through which air may move by convection.

References Cited in the file of this patent

UNITED STATES PATENTS

| | | |
|---|---|---|
| 1,528,053 | Hands | Mar. 3, 1925 |
| 2,042,595 | Graham | June 2, 1936 |
| 2,099,210 | Ireland | Nov. 16, 1937 |
| 2,207,871 | Myers | July 16, 1940 |
| 2,316,872 | Kernon | Apr. 20, 1943 |
| 2,415,963 | Olving | Feb. 18, 1947 |
| 2,436,575 | Johnson | Feb. 24, 1948 |
| 2,459,169 | Koci | Jan. 18, 1949 |
| 2,567,756 | Amsler | Sept. 11, 1951 |
| 2,615,386 | Palmer | Oct. 28, 1952 |